(12) United States Patent
Lee

(10) Patent No.: US 9,403,144 B2
(45) Date of Patent: Aug. 2, 2016

(54) APPARATUS FOR MASS POLYMERIZATION OF VINYL CHLORIDE RESIN AND METHOD FOR MASS POLYMERIZATION OF VINYL CHLORIDE RESIN

(71) Applicant: LG CHEM, LTD., Seoul (KR)

(72) Inventor: Dong Kwon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/773,678

(22) PCT Filed: Sep. 30, 2014

(86) PCT No.: PCT/KR2014/009223
§ 371 (c)(1),
(2) Date: Sep. 8, 2015

(87) PCT Pub. No.: WO2015/047040
PCT Pub. Date: Apr. 2, 2015

(65) Prior Publication Data
US 2016/0038910 A1 Feb. 11, 2016

(30) Foreign Application Priority Data

Sep. 30, 2013 (KR) .......................... 10-2013-0116987

(51) Int. Cl.
| | | |
|---|---|---|
| C08F 114/06 | (2006.01) |
| B01J 19/00 | (2006.01) |
| B01J 19/24 | (2006.01) |
| C08F 14/06 | (2006.01) |
| C08F 2/02 | (2006.01) |
| B01J 19/18 | (2006.01) |

(52) U.S. Cl.
CPC .............. *B01J 19/24* (2013.01); *B01J 19/0066* (2013.01); *B01J 19/18* (2013.01); *B01J 19/1862* (2013.01); *C08F 2/02* (2013.01); *C08F 14/06* (2013.01); *C08F 114/06* (2013.01); *B01J 2219/00094* (2013.01); *B01J 2219/00162* (2013.01); *B01J 2219/24* (2013.01)

(58) Field of Classification Search
CPC ................... B01J 19/24; B01J 2219/24; B01J 2219/00162; C08F 114/06
USPC ........................................ 526/344.1; 422/131
See application file for complete search history.

(56) References Cited

U.S. PATENT DOCUMENTS

| | | | | |
|---|---|---|---|---|
| 4,009,048 A | * | 2/1977 | Jensen ...................... B08B 3/08 134/12 |
| 4,086,414 A | * | 4/1978 | Hornbaker ................. B01J 8/20 159/47.1 |
| 2005/0136547 A1 | * | 6/2005 | Larmon ............... G05B 13/041 436/55 |

FOREIGN PATENT DOCUMENTS

| | | |
|---|---|---|
| KR | 1020090039117 A | 4/2009 |
| KR | 1020090075486 A | 7/2009 |
| KR | 1020100023340 A | 3/2010 |
| KR | 1020110006223 A | 1/2011 |
| KR | 1020120049827 A | 5/2012 |

* cited by examiner

*Primary Examiner* — William Cheung
(74) *Attorney, Agent, or Firm* — Dentons US LLP

(57) ABSTRACT

Disclosed are an apparatus for mass polymerization of a vinyl chloride resin which may suppress generation of abnormal products (fine-particle products, oversize-particle products, lumpy products due to coagulation, etc.) and a vinyl chloride resin, which causes formation of a poor sphere, and may enhance quality and processability of a vinyl chloride resin, by addressing the problem that an average distance between resin particles is decreased as polymerization proceeds, and thus, microparticles are generated due to excessive coagulation or friction between particles, and a method of mass-polymerizing the vinyl chloride resin. The method comprises additionally inputting a monomer to a reactor in which a monomer and an initiator are contained when a ratio of the monomer converted to a polymer is 30% to 70%.

11 Claims, 2 Drawing Sheets

APPARATUS FOR MASS POLYMERIZATION OF VINYL CHLORIDE RESIN AND METHOD FOR MASS POLYMERIZATION OF VINYL CHLORIDE RESIN

This application is a National Stage Application of International Application No. PCT/KR2014/009223, filed Sep. 30, 2014, and claims the benefit of Korean Application No. 10-2013-0116987, filed Sep. 30, 2013, all of which are hereby incorporated by reference in their entirety for all purposes as if fully set forth herein.

TECHNICAL FIELD

The present invention relates to an apparatus for mass polymerization of a vinyl chloride resin and a method of mass-polymerizing the vinyl chloride resin. More particularly, the present invention relates to an apparatus for mass polymerization of a vinyl chloride resin which may suppress generation of abnormal products (fine-particle products, oversize-particle products, lumpy products due to coagulation, etc.) and a vinyl chloride resin, which causes formation of a poor sphere, and may enhance quality and processability of a vinyl chloride resin, by addressing the problem that an average distance between resin particles is decreased as polymerization proceeds, and thus, microparticles are generated due to excessive coagulation or friction between particles, and a method of mass-polymerizing the vinyl chloride resin.

BACKGROUND ART

A vinyl chloride resin is also referred to as polyvinyl chloride or PVC. A vinyl chloride resin softened at 150° C. to 170° C. is an easily processed thermoplastic resin. A vinyl chloride resin has properties such as superior water resistance, chemical resistance and petroleum resistance, and is hard, thus being used in line plates, pumps, tanks, plated water tanks, treated water tanks, etc. A vinyl chloride including a large amount of plasticizer (40% to 80%) is soft, thus being used in sheets, sides, films, tiles, etc.

When a vinyl chloride resin is prepared through mass polymerization, a heating medium such as water is not used unlike in suspension polymerization or emulsion polymerization, and a vinyl chloride monomer (VCM), an initiator, and, as needed, a reaction additive are supplied and polymerized. In this case, a vinyl chloride resin may be obtained without a dying process after reaction. In addition, in regard to mass polymerization, an apparatus therefor is simple, a reaction rate is fast, a yield is high, highly pure polymer may be obtained, and a polymer may be used as it is. However, there are disadvantages such as difficult temperature control due to strong heat release of a polymeric system, extension of molecular weight distribution of a polymer, and uneasy precipitation. Accordingly, in mass polymerization, a heating medium for heat removal does not exist, and thus, it is very important to maintain stable heat removal.

To a reactor for mass polymerization, only vinyl chloride monomer and initiator are provided before initiation of polymerization reaction, and water as a heating medium as in emulsion polymerization or suspension polymerization is not supplied. Accordingly, when a vinyl chloride resin is prepared using mass polymerization, the amount of liquid vinyl chloride monomer in a reaction system decreases and the amount of solid vinyl chloride resin increases, as polymerization proceeds. Accordingly, a solid vinyl chloride resin and a liquid vinyl chloride monomer have a dispersed shape. In particular, since the specific gravity (1.35 to 1.45) of vinyl chloride resin is greater than the specific gravity (approximately 0.97) of vinyl chloride monomer, a vinyl chloride resin predominantly locates in a lower portion of a reactor. As polymerization proceeds, the amount of vinyl chloride monomer decreases and the amount of vinyl chloride resin increases. Accordingly, all vinyl chloride resins generated in an initial reaction step may maintain a shape wherein the vinyl chloride resins are surrounded with vinyl chloride monomers. However, since, as polymerization proceeds, the amount of vinyl chloride resin increases and the amount of vinyl chloride monomer decreases, a solid vinyl chloride resin cannot maintain a shape wherein the solid vinyl chloride resin is surrounded with a liquid, namely, a liquid vinyl chloride monomer. Accordingly, fluidity of a vinyl chloride resin decreases and an average distance between vinyl chloride resin particles is shortened, whereby microparticles may be generated due to excessive coagulation between particles or friction between particles.

In addition, when a liquid vinyl chloride monomer exists in a sufficient amount, vaporization of a liquid vinyl chloride monomer may be induced by properly removing a gaseous vinyl chloride monomer in a reaction system, whereby reaction heat (namely, polymerization heat) is removed and thus proper reaction temperature (namely, polymerization temperature) may be stably maintained. However, when a liquid vinyl chloride monomer is deficient, it is difficult to remove reaction heat and thus local heating may be encountered, whereby coagulation may be induced due to fusion between vinyl chloride resin particles.

The problems described above are directly related to abnormal products (fine-particle products, oversize-particle products, lumpy products due to coagulation, etc.), and generation of a vinyl chloride resin, which causes formation of a poor sphere.

Until today, interests have been mainly focused on collecting fine particles by installing a separate particle separator after reaction, in order to lower the content of fine particles. In this regard, when a screening method generally used to remove fine particles is used, a screen is easily clogged due to poor static characteristics of bulk-polymerization particles. To compensate for this, U.S. Pat. No. 4,963,634 introduces a collection method using air movement. However, the technology is expensive and use of fine particles collected therefrom is not proper. Accordingly, the method is not a fundamental solution.

Meanwhile, fine particles comprised in a vinyl chloride resin float in the air, and harmfully affect skin and respiratory organs of workers. In addition, upon processing, fine particles melt faster than other particles. When heat is continuously applied, the fine particles are carbonized and thus a surface appearance of a molded product becomes poor or whiteness is decreased. In addition, carbonized particles function as a defect in a molded product and thus, when impact is applied, the carbonized particles function as a start point or an expansion point of cracks. Accordingly, impact strength may be decreased, whereby technology of decreasing such fine particles is very important.

DISCLOSURE

Technical Problem

Therefore, the present invention has been made in view of the above problems, and it is one object of the present invention to suppress generation of abnormal products (fine-particle products, oversize-particle products, lumpy products due to coagulation, etc.) and a vinyl chloride resin, which causes formation of a poor sphere, and to enhance quality and processability of a vinyl chloride resin, by addressing the problem that an average distance between resin particles is decreased as polymerization proceeds, and thus, microparticles are generated due to excessive coagulation or friction between particles through additional addition of a monomer into a reaction system in which mass polymerization is performed, during mass polymerization, particularly when a ratio of a monomer converted to a polymer is 30% to 70%

Technical Solution

In accordance with one aspect of the present invention, provided is an apparatus for mass polymerization of a vinyl chloride resin comprising a reactor for mass polymerization, and further comprising an additional supply pipe for additionally supplying a monomer into the reactor during polymerization of the monomer in the reactor in which the monomer and an initiator are contained.

The reactor may further comprise at least one raw material supply pipe and condenser.

The reactor may further comprise an exhaust pipe.

The exhaust pipe may further comprise a pressure control valve.

The additional supply pipe may be connected to a lower portion of the reactor.

The apparatus for mass polymerization of a vinyl chloride resin may further comprise a prepolymerization reactor, and the reactor further comprises a raw material supply pipe fluidly connecting the reactor and the prepolymerization reactor such that a seed polymer generated in the prepolymerization reactor is flowed therein and a raw material supply pipe for supplying a monomer and a postpolymerization initiator to the reactor.

In accordance with another aspect of the present invention, provided is a method of mass-polymerizing a vinyl chloride resin using the apparatus for mass polymerization of a vinyl chloride resin according to the present invention, the method comprising an additional monomer supply step in which a monomer is additionally supplied into a reactor comprising the monomer and an initiator when a ratio of the monomer converted to a polymer is 30% to 70%.

The additionally supplied monomer may be supplied to a lower portion of the reactor.

In the additional monomer supply step, the monomer may be continuously supplied into the reactor.

In the additional monomer supply step, an amount of the monomer supplied may be 10% to 30% per hour with respect to the amount of the monomer converted to the polymer.

A monomer discharge step may be further performed during or after the additional monomer supply step.

In the monomer discharge step, the amount of discharged monomer may be 80% to 100% relative to the amount of supplied monomer in the additional monomer supply step.

In the monomer discharge step, the monomer discharge may be performed out through a condenser, an exhaust pipe, or a combination thereof.

Advantageous Effects

As apparent from the foregoing, the present invention advantageously provides an apparatus for mass polymerization of a vinyl chloride resin which may suppress generation of abnormal products (fine-particle products, oversize-particle products, lumpy products due to coagulation, etc.) and a vinyl chloride resin, which causes formation of a poor sphere, and may enhance quality and processability of a vinyl chloride resin, by addressing the problem that an average distance between resin particles is decreased as polymerization proceeds, and thus, microparticles are generated due to excessive coagulation or friction between particles, and a method of mass-polymerizing the vinyl chloride resin. The method comprises additionally inputting a monomer to a reactor, in which the monomer and an initiator are contained, when a ratio of the monomer converted to a polymer is 30% to 70%.

In addition, according to the present invention, a method of mass-polymerizing the vinyl chloride resin using the apparatus for mass polymerization of a vinyl chloride resin is provided.

Furthermore, according to the present invention, generation of abnormal products (fine-particle products, oversize-particle products, lumpy products due to coagulation, etc.) is decreased and a vinyl chloride resin having normal particle-size-distribution of 75 to 200 μm is provided.

ELEMENT NUMBER DESCRIPTION

Figure 1:
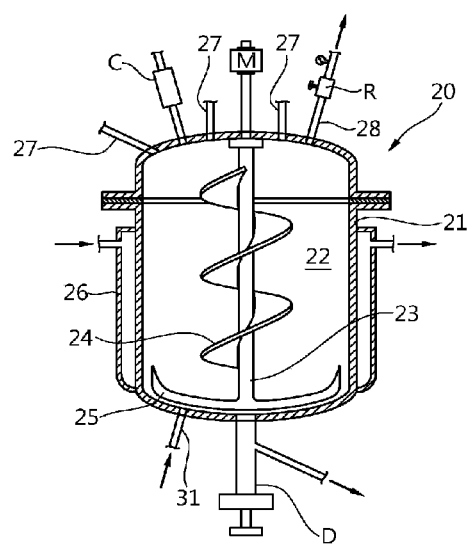
FIG. 1 schematically illustrates an embodiment of an apparatus for mass polymerization of a vinyl chloride resin according to the present invention.

10: Prepolymerization apparatus
11: Prepolymerization reactor
12: Reaction space
13: Rotation axis
14: Screw agitator
15: Scraper
16: Heat control jacket
17: Raw-material supply pipe
18: Exhaust pipe
M: Motor
C: Condenser
D: Discharge pipe
20: Apparatus for mass polymerization
21: Reactor
22: Reaction space
23: Rotation axis
24: Screw agitator
25: Scraper
26: Heat control jacket
27: Raw-material supply pipe
28: Exhaust pipe
M: Motor
C: Condenser
D: Discharge pipe

BEST MODE

Hereinafter, the present invention is described in more detail.

As illustrated in FIG. 1, an apparatus 20 for mass polymerization of a vinyl chloride resin according to the present invention comprises a reactor for mass polymerization, and further comprises an additional supply pipe 31 for additionally supplying a monomer into the reactor 21 when the monomer is polymerized in the reactor 21 comprising the monomer and an initiator.

The additional supply pipe 31 is fluidly connected to a monomer supply source (not shown) and supplies the monomer into the reactor 21.

The reactor 21 may further comprise at least one raw material supply pipe 27 and a condenser C. The number of the raw material supply pipe 27 may be one or more, preferably two to five, more preferably three. Through the raw material supply pipe 27, raw materials required for polymerization, a monomer, an initiator and, as needed, reaction additives may be supplied into the reactor 21. The condenser C resends raw materials to the reactor 21 or collects liquefied raw materials by liquefying the raw materials such as monomers volatilized as a vapor phase. In the present invention, a monomer liquefied in the condenser C is collected without resending the same to the reactor 21, and thus, the amount of monomer additionally input to the reactor 21 may be controlled.

The reactor 21 has an inner space. The inner space functions as a reaction space 22. A monomer and an initiator are input to the reaction space 22, and polymerization is carried out.

The reactor 21 further comprises an agitator. It is appreciated by those skilled in this art that the agitator is not specifically limited as long as reaction products in the reaction space 22 are stirred. An agitator illustrated as an embodiment in FIG. 1 is a screw agitator 24, and the screw agitator 24 is fixed to a rotation axis 23 and simultaneously rotated by rotation of the rotation axis 23, thereby stirring reaction products in the reaction space 22. The rotation axis 23 is extended to the exterior of the reactor 21, a motor M is connected to an end of the exterior (that is, an end located in the exterior of the reactor external based on the reactor), and the end is simultaneously rotated by rotation of the motor M. As needed, a governor and/or a transmission may be connected between the motor M and the rotation axis 23. A scraper 25 may be further connected to an interior end of the rotation axis 23 (that is, an end located inside the reactor) to which the screw agitator 24 is connected. The scraper 25 contacts a bottom of the reactor 21 or is located near a bottom of the reactor to scrape materials deposited or accumulated on the bottom of the reactor 21.

The reactor 21 may further comprise an exhaust pipe 28. The exhaust pipe 28 is fluidly connected to the reactor 21 to discharge gaseous materials that should be discharged from the reactor 21. Here, air is discharged when the interior of the reactor 21 is purged with air, nitrogen, etc., or interior pressure of the reactor 21 is controlled or gaseous materials that should be discharged or after reaction are discharged when reaction products such as a monomer and initiator are supplied into the interior of the interior of the reactor 21.

The exhaust pipe 28 may further comprise a pressure control valve R. In the present invention, a portion of a vaporized gaseous monomer in the reactor 21 is discharged from the reactor 21 by properly opening the pressure control valve R installed in the exhaust pipe 28, and thus, the amount of monomer input to the reactor 21 is controlled. The pressure control valve R controls flow of gaseous materials through control of the exhaust pipe 28, thus increasing pressure of the interior of the reactor 21 by blocking gaseous flow passing through the exhaust pipe 28, or decreasing pressure of the interior of the reactor 21 through continuous gaseous flow. A flowmeter or a pressure gauge may be further connected to the exhaust pipe 28. Alternatively, a mass flow controller (MFC) may be connected to the exhaust pipe 28. The mass flow controller is publicly known and may be purchased from many manufacturers at home and abroad.

The additional supply pipe 31 may be connected to a lower portion of the reactor 21. Due to such a composition, a monomer is additionally supplied to a lower portion of the reactor 21, in which a vinyl chloride resin having a relatively high specific gravity may be accumulated, to effectively decrease overheating of a vinyl chloride resin mainly located in the portion part, collision between resin particles, etc., particularly when compared to a vinyl chloride monomer.

A temperature control jacket 26 such as a water jacket may be further mounted on the exterior of the reactor 21. The temperature control jacket may control an inner temperature by circulating a heating medium, mainly hot or cold water or hot or cold oil to control temperature of the reactor 21, particularly inner temperature of the reactor 21 according to control temperature of the hot or cold heating medium.

A discharge pipe D is fluidly connected to a lower portion of the reactor 21, and, through the discharge pipe D, a reaction product, namely, reaction products such as a polymerized resin product, other unreacted monomers and an initiator may be discharged from the reactor 21 and collected.

Figure 2:
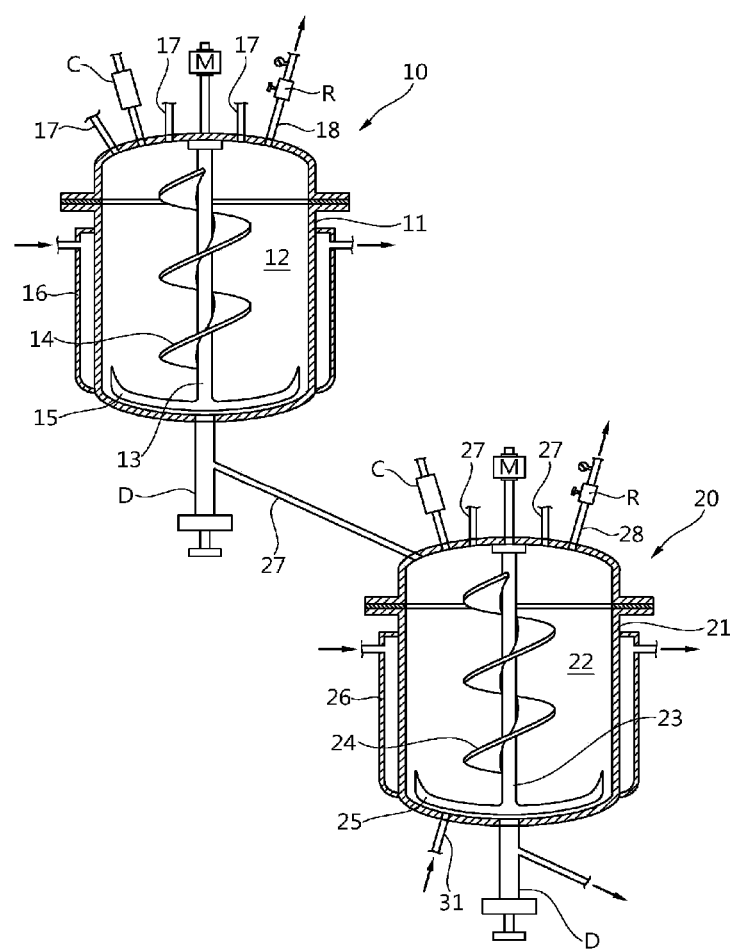
FIG. 2 schematically illustrates another embodiment of an apparatus for mass polymerization of a vinyl chloride resin according to the present invention.

As illustrated in FIG. 2, the apparatus 20 for mass polymerization of a vinyl chloride resin may further comprise a prepolymerization apparatus 10. The prepolymerization apparatus 10 further comprises a prepolymerization reactor 11. The reactor 21 may further comprise a raw material supply pipe 27 that fluidly connects the reactor 21 and the prepolymerization reactor for inpourring a seed polymer generated in the prepolymerization reactor 11, and a raw material supply pipe 27 for supplying the monomer and the postpolymerization initiator into the reactor 21. In the present invention, a seed polymer passes through the raw material supply pipe 27, and a monomer and a postpolymerization initiator also pass through the raw material supply pipe 27. In this regard, all of a monomer, a seed polymer, other initiators and reaction additives are understood as raw materials for polymerization, and raw material supply pipes 27 supply the raw materials.

Other compositions of the prepolymerization apparatus 10 are the same or similar to elements corresponding to the apparatus 20 for mass polymerization of a vinyl chloride resin according to the present invention, and only the reference numbers are different. The prepolymerization apparatus 10 comprises a prepolymerization reactor. An inner space of the prepolymerization reactor 11 functions as a reaction space 12, and comprises a rotation axis 13 and an agitator installed on the rotation axis 13, namely, a screw agitator 14, and a scraper 15. In addition, a temperature control jacket 16 is installed in the exterior of the prepolymerization reactor 11. In addition, at least one raw material supply pipe 17 and exhaust pipe 18 to supply raw materials for reaction are connected to the interior of the prepolymerization reactor 11, and the rotation axis 13 is connected to the motor M, thereby rotating by the motor M. In addition, a condenser C and a discharge pipe D are further connected to the prepolymerization reactor 11, and a pressure control valve R may be further connected to the exhaust pipe 18. Although FIG. 2 illustrates the prepolymerization apparatus 10 as a reactor 11 in which a screw agitator 14 and a scraper 15 are installed, the present invention is not limited thereto and it will be appreciated that another reactor type to which a turbine-type impeller is attached may be alternatively used.

A monomer, an initiator and other reaction additives are supplied to the prepolymerization reactor 11 of the prepolymerization apparatus 10, and fast stirring and polymerization are carried out under high pressure, thereby forming a seed polymer. It was known that diameter distribution and properties of generated particles were enhanced as this process was faster and more uniform.

FIG. 2 illustrates that the prepolymerization apparatus 10 does not further comprise an additional supply pipe. However, the prepolymerization reactor 11 of the prepolymerization apparatus 10 also further comprises an additional supply pipe for additional supply of a monomer. Preferably, the additional supply pipe may be connected to a lower portion of the prepolymerization reactor 11.

In addition, in a method of mass-polymerizing the vinyl chloride resin using the apparatus for mass polymerization of a vinyl chloride resin according to the present invention, a monomer is additionally supplied into a reactor in which a monomer and an initiator are contained. In particular, the method comprises an additional monomer supply step, wherein additional supply into the reactor is carried out when a ratio of the monomer converted to a polymer is 30% to 70%. Here, a key point of the present invention is that, according to a ratio of the monomer converted to the polymer calculated by dividing generated polymerization heat by polymerization heat of polyvinyl chloride using a calorimeter, a monomer is additionally supplied starting when the conversion rate is 30% (it can be confirmed that a loading amount of an agitator directly increases from this time point through current variation (ampere variation)), and the additional supply of the monomer is stopped when the conversion rate is greater than 70% (starting when inner pressure of the reactor is slowly decreased). When the monomer is additionally supplied at a conversion rate of less than 30%, the levels of fine particles and a reaction product may increase. When the monomer is additionally supplied at a conversion rate of greater than 70%, polymerization time and collection time of unreacted monomer may be extended.

The additional monomer supply step described above is carried out by additionally inputting the monomer into the reactor through the additional supply pipe of the apparatus for mass polymerization of a vinyl chloride resin according to the present invention having the compositions described above.

The additionally supplied monomer may be supplied to a lower portion of the reactor. Accordingly, overheating, collision between resin particles, etc. of a vinyl chloride resin mainly located in a lower portion of the reactor by additionally supplying the monomer to the lower portion of the reactor in which a vinyl chloride resin having a relatively high specific gravity, compared to a vinyl chloride monomer, may be accumulated, may be more effectively decreased.

In the additional monomer supply step, additional supply of the monomer may be carried out by continuously supplying the monomer to the reactor, but the present invention is not limited thereto. As needed, it is understandable that the monomer may be intermittently, additionally supplied.

In the additional monomer supply step, the monomer may be supplied within a range within the amount of the monomer converted to a polymer is 10% to 30%, more preferably 15% to 30%, most preferably 22% to 25% per hour (the monomer may be input in an amount of approximately 80% relative to a used reactor size). Preferably, a monomer discharge step may be carried out with or after the additional monomer supply step. Accordingly, the amount of the monomer in the reactor and the amount of reaction products may be properly controlled.

In the monomer discharge step, the amount of the discharged monomer may be 80% to 100% relative to the amount of the monomer supplied in the additional monomer supply step. Accordingly, by additionally supplying the monomer, total balance of a reaction system is maintained. That is, excessive coagulation among particles or microparticle generation by friction between particles, due to decrease of an average distance between resin particles as polymerization proceeds, may be addressed while maintaining an initial proper polymerization condition. Accordingly, generation of abnormal products (fine-particle products, oversize-particle products, lumpy products due to coagulation, etc.) and a vinyl chloride resin, which causes formation of a poor sphere may be prevented.

In the monomer discharge step, monomer discharge may be carried out through a condenser, an exhaust pipe, or a combination thereof. As described above, the condenser liquefies raw materials such as monomers volatilized to a vapor phase, and resends the liquefied materials into a reactor or collects the liquefied raw materials. According to the present invention, a monomer liquefied in the condenser is collected without resending into the reactor, and thus, the amount of monomer input additionally into the reactor may be controlled. In addition, the exhaust pipe may control the amount of monomer additionally input to the reactor by discharging a portion of a vaporized gaseous monomer from the reactor through proper opening of the pressure control valve installed in the exhaust pipe.

In an embodiment, polymerization in the reactor 21 of the apparatus 20 for mass polymerization of a vinyl chloride resin according to the present invention may be carried out under a pressure of 8 to 10 K/G. Accordingly, the additional monomer input described above may be carried out under slightly higher pressure, for example, 8.1 to 12 K/G, than the pressure of the reaction described above, but the present invention is not limited thereto.

Polymerization in the prepolymerization reactor 11 of the prepolymerization apparatus 10 may be also carried out at the same pressure, for example, 8 to 10 K/G, as polymerization in the reactor 21 of the apparatus 20 for mass polymerization of a vinyl chloride resin.

Although the present invention is described in conjunction with application of a vinyl chloride monomer for preparing a vinyl chloride resin, it will be understood by those skilled in the art that the present invention may be applied to polymerization of other vinyl monomers. In addition, it should be understood that the present invention is not limited to polymerization of the vinyl chloride monomer as described above.

Although the preferred embodiments of the present invention are disclosed for illustrative purposes, those skilled in the art will appreciate that various modifications, additions and substitutions are possible, without departing from the scope and spirit of the invention as disclosed in the accompanying claims.

EXAMPLE

Example 1

135 kg of a vinyl chloride monomer was input to a reactor of a 200 l prepolymerization apparatus and 0.03 parts by weight of t-butylperoxyneodecanoate (BND) as an initiator based on 100 parts by weight of vinyl chloride monomer was added thereto. Subsequently, pressure was elevated to 12 K/G and polymerization was carried out for 18 minutes, thereby preparing a seed polymer having a size of 100 to 140 µm. The prepared seed polymer was input to a reactor (500 l), a raw material supply pipe was installed in a lower portion of which, for postpolymerization according to present invention, as illustrated in FIG. 2. In this regard, 50 parts by weight of the vinyl chloride monomer were transferred and input to the reactor according to the present invention. When transfer of the vinyl chloride monomer was completed, 0.06 parts by weight of 1,1,3,3-tetramethylbutyl peroxyneodicarbonate (OND) as an initiator was input and polymerization was carried out for 180 minutes under a pressure of 7.8 K/G. Here, when a conversion rate was 30% (when fall of inner temperature of the reactor was started), 5 parts by weight of the vinyl chloride monomer was additionally input. Such additionally monomer input was maintained until pressure was dropped (when the conversion rate was 70%). Subsequently, in a last stage of polymerization, 0.01 parts by weight of butylated hydroxytoluene as a polymerization inhibitor was input, and heating was carried out at 70° C. for 20 minutes in a vacuum while stirring. Accordingly, a remaining vinyl chloride monomer was removed, thereby obtaining a vinyl chloride resin.

Example 2

135 kg of a vinyl chloride monomer was input to a reactor of a 200 l prepolymerization apparatus and 0.05 parts by weight of di-2-ethylhexhy peroxydecarbonate (OPP) as an initiator based on 100 parts by weight of vinyl chloride monomer was added thereto. Subsequently, pressure was elevated to 10 K/G and polymerization was carried out for 16 minutes, thereby preparing a seed polymer having a size of 110 μm. The prepared seed polymer was input to a reactor (500 l), a raw material supply pipe was installed in a lower portion of which, for postpolymerization according to present invention, as illustrated in FIG. 2. In this regard, 60 parts by weight of the vinyl chloride monomer were transferred and input to the reactor according to the present invention. When transfer of the vinyl chloride monomer was completed, 0.1 parts by weight of 1,1,3,3-tetramethylbutyl peroxyneodicarbonate (OND) as an initiator was input and polymerization was carried out for 40 minutes under a pressure of 7.1 K/G and for 140 minutes under a pressure of 8.1 K/G. Here, when a conversion rate was 30% (when fall of inner temperature of the reactor was started), 15 parts by weight of the vinyl chloride monomer was additionally input per hour. Such additional monomer input was maintained until pressure was dropped (when the conversion rate was 70%). Subsequently, in a last stage of polymerization, 0.01 parts by weight of butylated hydroxytoluene as a polymerization inhibitor was input, and heating was carried at 66° C. for 20 minutes in a vacuum while stirring. Accordingly, a remaining vinyl chloride monomer was removed, thereby obtaining a vinyl chloride resin. Properties of the obtained vinyl chloride resin were tested, and results were summarized in Table 1 below.

Example 3

The same process as in Example 1 was carried out, except that, when a conversion rate was 30% (when fall of inner temperature of the reactor was started), 10 parts by weight, instead of 5 parts by weight, of vinyl chloride monomer was additionally input.

Comparative Example

The same process as in Example 1 was carried out, except that, when a conversion rate was 30% (when fall of inner temperature of the reactor was started), a vinyl chloride monomer was not additionally input.

Accordingly, it can be confirmed that, by addressing the problem that an average distance between resin particles is decreased as polymerization proceeds, and thus, microparticles are generated due to excessive coagulation or friction between particles, generation of abnormal products (fine-particle products, oversize-particle products, lumpy products due to coagulation, etc.) and a vinyl chloride resin, which causes formation of a poor sphere may be suppressed and quality and processability of a vinyl chloride resin may be enhanced.

What is claimed is:

1. An apparatus for mass polymerization of a vinyl chloride resin comprising a reactor for mass polymerization, the apparatus further comprising an additional supply pipe for additionally supplying a monomer into the reactor during polymerization of the monomer in the reactor in which the monomer and an initiator are contained, and
   wherein the additional supply pipe is connected to a lower portion of the reactor.

2. The apparatus according to claim 1, wherein the reactor further comprises at least one raw material supply pipe and condenser.

3. The apparatus according to claim 1, wherein the reactor further comprises an exhaust pipe.

4. The apparatus according to claim 3, wherein the exhaust pipe further comprises a pressure control valve.

5. The apparatus according to claim 1, wherein the apparatus further comprises a prepolymerization reactor and a raw material supply pipe connecting the reactor and the prepolymerization reactor such that a seed polymer generated in the prepolymerization reactor is flowed in the reactor and another raw material supply pipe for supplying a monomer and a postpolymerization initiator to the reactor.

6. A method of mass-polymerizing a vinyl chloride resin, the method comprising an additional monomer supply step in which a monomer is additionally supplied into a reactor comprising the monomer and an initiator when a ratio of the monomer converted to a polymer is 30% to 70%, and
   wherein the additionally supplied monomer is supplied to a lower portion of the reactor.

7. The method according to claim 6, wherein, in the additional monomer supply step, the monomer is continuously supplied into the reactor.

8. The method according to claim 6, wherein, in the additional monomer supply step, an amount of the monomer supplied is 0.1 to 10 times within a range within which an amount of the monomer converted to the polymer is 30% to 70%.

9. The method according to claim 6, wherein a monomer discharge step is further performed during or after the additional monomer supply step.

10. The method according to claim 9, wherein, in the monomer discharge step, an amount of discharged monomer

TABLE 1

|  | Example 1 (conversion rate: 30% to 70%) (5% relative to initial input amount was continuously input) | Example 2 (conversion rate: 30% to 70%) (15% relative to initial input amount was continuously input) | Example 3 (conversion rate: 30% to 70%) (10% relative to initial input amount was continuously input) | Comparative Example |
| --- | --- | --- | --- | --- |
| Particle diameter (μm) | 168 | 170 | 165 | 160 |
| Below 70 μm (%) | 1.60 | 1.6 | 1.8 | 2.6 |
| Below 20 μm (%) | 0.7 | 0.7 | 0.65 | 1.10 |
| Lump (%) | 1.7 | 1.8 | 2 | 3 | is 0.1 to 10 times an amount of supplied monomer in the additional monomer supply step.

11. The method according to claim 9, wherein, in the monomer discharge step, the monomer discharge is performed through a condenser, an exhaust pipe, or a combination thereof.

* * * * *